United States Patent Office

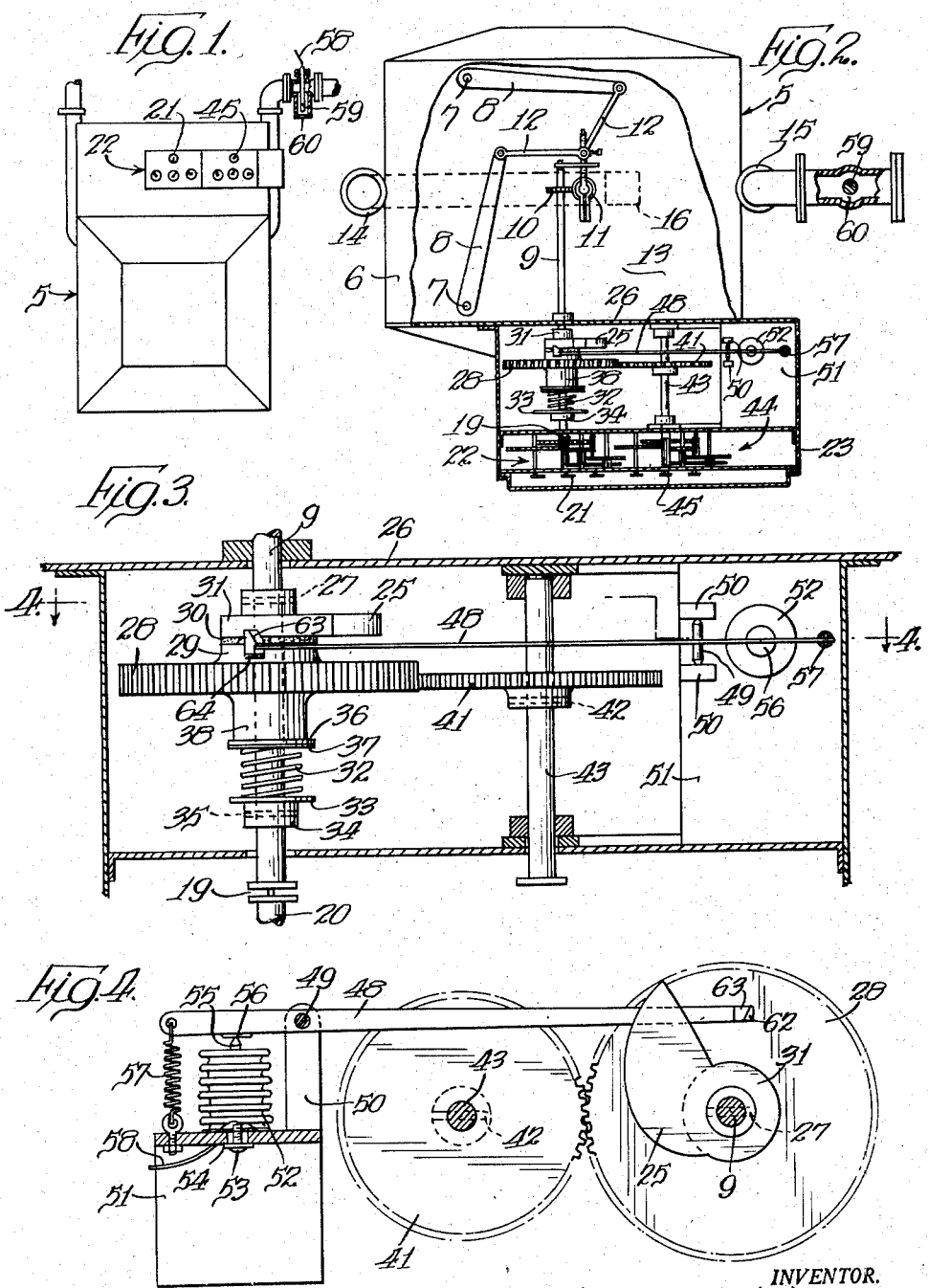

2,886,969
Patented May 19, 1959

2,886,969

TEMPERATURE COMPENSATING MEANS FOR FLUID METERS

Raymond J. Dufour, Wheaton, Ill.

Application September 2, 1954, Serial No. 453,903

5 Claims. (Cl. 73—233)

This invention relates to meters of the positive displacement type for metering fluids by a predetermined unit volume and in which the actual fluid content per unit volume is based on a standard temperature of the fluid metered, and has to do with means whereby differences in actual fluid content per unit volume metered, due to variations in temperature from the standard, are compensated for so as to indicate the total amount of fluid metered in accordance with the standard temperature.

In known mechanical meters, particularly those of the positive displacement type used for metering fluids (liquids, vapors or gases) it is usually the practice to have the mechanism constructed so that the action of the metering elements finally produces rotary motion of a shaft which in turn drives a register or index for totalizing the cycles the meter has made. The index contains appropriate gearing to register the metered flow in units of volume, weight, or simply in number of meter cycles.

The known meters fail to give accurate results when the fluid being metered is subjected to varying temperatures because the meter is unable to differentiate between a unit volume of fluid at standard temperature and an equal volume of fluid expanded or contracted by temperature other than standard. In order to yield accurate registration in terms of units at standard temperature, some means must be provided that will increase the registration by an appropriate amount during each meter cycle in which fluid colder than standard is being measured, and, conversely, will decrease the registration by an appropriate amount during each meter cycle in which fluid warmer than standard is being measured.

My invention is directed to means which indicates the total amount of fluid metered on the basis of the standard temperature, by compensating for variations in the actual fluid content per unit volume caused by variations in temperature from the standard. The compensating means of my invention is of simple construction and operation and may readily be applied to present day meters without necessity of substantial changes therein, which is of considerable practical importance. It comprises an auxiliary register or index which is driven from the usual index shaft of the meter by means which automatically compensates for variations in temperature from the standard of the fluid being metered. In applying the compensating means of my invention to a known meter the index of the latter, including the prover hand thereof, may be retained, which is advantageous in that the prover hand remains available for testing the meter by known means. Further objects and advantages of my invention will appear from the detail description.

In the drawings:

Figure 1 is a front view of a meter provided with temperature compensating means embodying my invention, with a fitting in the outlet tube shown in section;

Figure 2 is a plan view, on an enlarged scale, of the meter of Figure 1 with the top wall broken away in major portion and the index housing at the front of the meter shown in horizontal section;

Figure 3 is a plan view, on an enlarged scale, of the temperature compensating means of my invention, showing the meter index drive shaft and the compensating index shaft and associated elements; and Figure 4 is a rear view of the compensating means of Figure 3, taken substantially on line 4—4 of Figure 3.

I have shown the temperature compensating means of my invention as applied to a gas meter 5 of known type, by way of example, but such compensating means, in its broader aspects, may be used with meters of other types for metering various fluids, including liquids, vapors and gases, susceptible of metering. The gas meter 5 is a Glover type of meter and is provided with measuring mechanism enclosed within a box like casing 6. The measuring mechanism comprises bellows (not shown), flag rods 7 actuated by the bellows, flag arms 8 on the upper ends of rods 7, and an index shaft 9 on which is secured a gear 10 driven by a worm 11 which is rotated in a known manner by known operating connections to short flag arms 12 hinged to the long flag arms 8. The casing 6 is provided interiorly with a horizontal partition or valve table 13 defining with the portion of casing 6 extending thereabove a space commonly termed the gallery chamber. The flag arms 8 and 12 and associated mechanism just described are disposed above valve table 13 in the gallery chamber. Inlet and outlet tubes 14 and 15, respectively, are disposed at opposite sides of casing 6, and an inlet channel 16 extends from tube 14 inwardly along the underface of valve table 13 to suitable valve means (not shown), actuated by the mechanism which drives worm 11, for admitting gas to and exhausting gas from the two bellows alternately. The gas exhausted through the valve means leaves the meter through the outlet tube 15.

The index shaft 9 has driving connection, by means of a pin and slot coupling 19 of known type, to a coaxial supplementary index shaft 20 which drives the prover hand 21 of a registration device or index 22 mounted in an index housing 23 at the front of the meter casing 6. The index 22 is of known construction and operation and need not be described in greater detail.

A cam 25 is fixed on shaft 9 outwardly beyond front wall 26 of the meter casing 6, conveniently by means of a pin 27. A spur gear 28 is slidably mounted on shaft 9 adjacent the outer side of cam 25 and is free from shaft 9. The inner end of the inner hub 29 of gear 28 normally is held in pressure contact with a friction disc 30 secured to the outer face of hub 31 of cam 25. To that end, a compression spring 32 is mounted about shaft 9 and is confined between a washer 33 encircling shaft 9 and abutting a collar 34 fixed on shaft 9, conveniently by means of a pin 35, and two washers 36 and 37, the latter seating against the outer end of the outer hub 38 of spur gear 28. The spring 32 is of appropriate strength normally to maintain hub 29 of spur gear 28 in contact with the friction disc 30 under pressure sufficient to assure that gear wheel 28 will be clutched to the cam 25 so as to rotate therewith and with the shaft 9.

The spur 28 meshes with a second spur gear 41 fixed, conveniently by means of a pin 42, on a compensating index shaft 43 which drives an auxiliary or compensating index 44 also mounted in the index housing 23, adjacent the index 22. The index 44 may be of any suitable type and is shown, by way of example, as being similar to the index 22 and having a hand 45 driven by shaft 43 and corresponding to the prover hand 21 of index 22. The spur gear 28 has a wide face relative to the spur gear 41, as shown in Figure 3, so as to maintain mesh with the latter gear during sliding movement of gear 28 on shaft 9, as will appear more fully presently.

A lever arm 48 is pivotally mounted adjacent its outer end, by means of a pivot pin 49, between two uprights 50 extending upwardly from a mounting bracket 51 suitably secured to the front wall 26 of meter casing 6 and disposed within the index housing 23. A metal bellows or sylphon 52 seats at its lower end on bracket 51, to which it is anchored by means of a screw 53 passing through a clamp plate 54, or in any suitable manner. A pointed stud 55 is secured to the upper head or top of the bellows 52 with the point thereof engaging in a corresponding recess in a pad or block 56 secured to the lower edge or underface of the lever arm 48. A tension spring 57 is anchored at its upper end to the outer end of lever arm 48 and has its lower end anchored to the bracket 51, this spring acting in opposition to the bellows 52, disposed between spring 57 and the uprights 50. The interior of bellows 52 is connected by a capillary tube 58 to a bulb 59 containing a thermo-sensitive fluid. The bulb 59, in the form of my invention illustrated by way of example, is disposed within a well in a fitting 60 interposed in the outlet tube 15. It will be understood, from what has been said, that the bellows 52 and associated elements provide thermo-sensitive or temperature responsive means for rocking the lever arm 48 in opposite directions about the axis of its pivot 49. The lever arm 48 may be formed of a strip of steel and is of substantial width or vertical extent so as to be substantially rigid vertically or perpendicular to its pivot axis while possessing considerable resiliency and flexibility laterally or parallel with its pivot axis. The lever arm 48 extends inwardly across the spur gears 41 and 28 to the midportion of the latter gear. A cam follower 62, of approximately rectangular shape in plan and provided with a beveled surface 63, is fixed on the inner end of the lever arm 48. The cam follower 62 is of such length or extent lengthwise of the index shaft 9 as normally to project inwardly a material distance beyond the outer face of cam 25 when in its normal position as shown, at which time a pad 64 of friction material secured to the outer end of follower 62 is spaced a short distance from the inner face of the spur gear 28. When the follower 62 is in its normal position shown in Figures 3 and 4, the spur gear 28 is clutched to the cam 25 and rotates therewith and with the shaft 9, as above explained. The shaft 43 of the compensating means is then driven from spur gear 28, as will be understood from what has been said.

In the operation of the meter 5, the index shaft 9, and with it the spur gear 28 and the cam 25, when clutched together, are rotated in clockwise direction as viewed in Figure 4. The cam 25 is of increasing width radially inward, as shown, and in its rotation with shaft 9 contacts the beveler surface 63 of follower 62 and forces the latter outwardly into contact with the spur gear 28 thereby moving the latter outwardly along shaft 9, in opposition to the compression spring 32, and de-clutching spur gear 28 from the cam 25 for the period of time required for the cam 25 to pass across the inner end of the follower 62 and beyond the latter, at which time follower 62 is returned to its normal inner position by the resiliency of the lever arm 48 and the spur gear 28 is again clutched to the cam 25 for rotation with the index shaft 9. In view of the fact that the cam 25 increases in width inwardly, substantially radial movement of the follower 62 inward radially of the spur gear 28 will increase the period of time during which the gear wheel 28 is declutched from cam 25 by the latter, and outward movement of follower 62 radially of gear wheel 28 will decrease the period of time during which the gear 28 is declutched from the cam 25 by the latter. The bellows 52 and associated elements constitute one form of means by which adjustment of the follower 62 radially of the gear wheel 28 may be accomplished, though within the broader aspects of my invention any suitable means may be provided for effecting such adjustment of the follower.

It may be assumed, for purposes of description, that the desired range of correction or compensation is plus or minus 20% of the volume of fluid displaced or metered and that the standard metering temperature is 60° F. Under the assumed conditions, the spur gear 28 may have 120 teeth and the spur gear 41 may have 100 teeth. At the standard temperature of 60° F. the follower would be positioned midway between the radially inner and outer ends of the leading edge of the cam 25. The shape of cam 25 is such that with the follower in the position which it occupies at the standard temperature of 60° F. the spur gear 28 will be declutched from the cam 25, and therefore from the shaft 9, during rotation of the index shaft through a distance equivalent to twenty of the teeth of the spur gear 28. Accordingly, under the conditions stated, one revolution of the index shaft 20 would rotate the spur gear 41, and with it the compensating index shaft 43, through one complete revolution and no correction or compensation would be effected, none being required. Assuming that the temperature of the gas or fluid passing through the outlet tube 15 falls below the standard temperature of 60° F. to such an extent that a correction of plus 10% is required, the bellows 52 contracts and the tension spring 57 turns the lever arm 48 in counter-clockwise direction about the axis of pin 49, as viewed in Figure 4, thereby moving the follower 62 radially outward of spur gear 28 to the proper extent to effect the desired correction or compensation. The spur gear 28 would then be declutched from cam 25 during a period of time corresponding to rotation of the index shaft through a distance equivalent to ten teeth of spur gear 28, which would thus be rotated to an extent equivalen to 110 teeth of that gear, and the spur gear 41 would be rotated a distance equivalent to 110 teeth of that spur gear, that is, through one revolution plus 10% during one revolution of the index shaft 9. Accordingly, the index shaft 43 of the compensating means will be turned through one complete revolution plus 10% while the index shaft 9 is turned through one revolution, thus giving the required correction or compensation on the index 44 of the compensating means. In like manner, if the temperature of the gas or fluid passing through the outlet tube 15 increases above the standard temperature of 60° F., correction or compensation will be automatically effected. Assuming that the temperature increase is such as to require a correction or compensation of minus 10%, the bellows 52 will expand to such an extent as to move the follower 62 radially inward of gear 28 such a distance that that gear will be de-clutched from cam 25 for a time period corresponding to rotation of index shaft 9 through a distance corresponding to thirty teeth of gear 28. Gear 28 would then be rotated, during one complete rotation of the index shaft 9, through a distance equal to but ninety teeth of gear 28, and gear 41 would be rotated through a distance corresponding to but ninety teeth of gear 41. Accordingly, index shaft 43 of the compensating means would be turned through but 90% of one revolution during one revolution of the index shaft 9, which gives the required correction or compensation for the compensating index 44.

Preferably, though not necessarily, the compensating index 44 is similar to the index 22 so that, in reading the meter, the reading should be taken from the compensating index 44. Accordingly, for practical purposes, the index 22 may be omitted except as to the prover hand 21, which preferably is retained for convenience in proving or testing the meter in a known manner. If desired, the compensating index 44 may indicate only the plus or minus correction or compensation to be made, in which case the index 22 should be retained in its entirety and the reading taken from the latter index corrected in accordance with the compensation or correction indicated by the compensating index.

It will be understood that variations in detail may be resorted to without departing from the field and scope of my invention, and I intend to include all such variations, as fall within the scope of the appended claims, in this application in which the preferred form only of my invention has been disclosed.

I claim:

1. In a positive displacement meter for metering fluid by a predetermined unit volume and in which the actual fluid content per unit volume is based on a standard temperature of the fluid being metered, a continuously rotating unidirectional shaft driven by said meter, a second shaft parallel with said first shaft, a cam fixed on said first shaft and increasing in width substantially radially inwardly thereof, a first gear on said first shaft free therefrom and yieldingly urged toward said cam, clutch means normally establishing driving connection between said first gear and said cam, a second gear fixed on said second shaft meshing with said first gear effective for driving said second shaft in one direction opposite to the direction of rotation of said first shaft, a compensating index driven by said second shaft, a cam follower adjacent the cam side of said first gear disposed to be moved by said cam into contact with said first gear and to move the latter away from and declutch it from said cam thereby interrupting the driving connection between said cam and first gear and stopping rotation of said second shaft, and temperature responsive means for adjusting said cam follower substantially radially of said first gear to vary the periods of time during which said second shaft is stopped in extent effective for compensating for the difference between the actual fluid content of the respective unit volumes metered at said standard temperature and the actual fluid content of the respective unit volumes metered at temperatures other than said standard temperature.

2. In a positive displacement meter for metering fluid by a predetermined unit volume and in which the actual fluid content per unit volume is based on a standard temperature of the fluid being metered, a continuosly rotating unidirectional shaft driven by said meter, a second shaft parallel with said first shaft, a cam fixed on said first shaft and increasing in width substantially radially inwardly thereof, a first gear on said first shaft free therefrom and yieldingly urged toward said cam, clutch means normally establishing driving connection between said first gear and said cam, a second gear fixed on said second shaft meshing with said first gear effective for driving said second shaft in one direction opposite to the direction of rotation of said first shaft, a compensating index driven by said second shaft, a cam follower adjacent the cam side of said first gear disposed to be moved by said cam into contact with said first gear and to move the latter away from and declutch it from said cam thereby interrupting the driving connection between said cam and first gear and stopping rotation of said second shaft, and temperature responsive means for adjusting said cam follower substantially radially of said first gear to vary the periods of time during which said second shaft is stopped in extent effective for compensating for the difference between the actual fluid content of the respective unit volumes metered at said standard temperature and the actual fluid content of the respective unit volumes metered at temperatures other than said standard temperature, said first gear and said cam follower having cooperating means effective for stopping rotation of first gear incident to declutching thereof from said cam.

3. In a positive displacement meter for metering fluid by a predetermined unit volume and in which the actual fluid content per unit volume is based on a standard temperature of the fluid being metered, a continuously rotating unidirectional shaft driven by said meter, a second shaft parallel with said first shaft, a cam fixed on said first shaft and increasing in width substantially radially inwardly thereof, a first gear on said first shaft free thereform and yieldingly urged toward said cam, clutch means normally establishing driving connection between said first gear and said cam, a second gear fixed on said second shaft meshing with said first gear effective for driving said second shaft in one direction opposite to the direction of rotation of said first shaft, a compensating index driven by said second shaft, an arm pivoted adjacent said second gear on an axis substantially parallel with said second shaft and overlapping the cam side of said first gear, said arm being substantially rigid perpendicular to its pivot axis and flexible parallel therewith, a cam follower carried by said arm disposed to be moved by said cam into pressure contact with said first gear and to move the latter away from and declutch it from said cam thereby interrupting the driving connection between said cam and said first gear and stopping rotation of said second shaft, and temperature responsive means for turning said arm about its pivot and thereby adjusting said cam follower substantially radially of said first gear to vary the periods of time during which said second shaft is stopped in extent effective for compensating for the difference between the actual fluid content of the respective unit volumes metered at said standard temperature and the actual fluid content of the respective unit volumes metered at temperatures other than said standard temperature.

4. In a positive displacement meter for metering fluid by a predetermined unit volume and in which the actual fluid content per unit volume is based on a standard temperature of the fluid being metered, a continuously rotating unidirectional shaft driven by said meter, a second shaft parallel with said first shaft, a cam fixed on said first shaft and increasing in width substantially radially inwardly thereof, a first gear on said first shaft free therefrom and yieldingly urged toward said cam, clutch means normally establishing driving connection between said first gear and said cam, a second gear fixed on said second shaft meshing with said first gear effective for driving said second shaft in one direction opposite to the direction of rotation of said first shaft, a compensating index driven by said second shaft, an arm pivoted adjacent said second gear on an axis substantially parallel with said second shaft and overlapping the cam side of said first gear, said arm being substantially rigid perpendicular to its pivot axis and flexible parallel therewith, a cam follower carried by said arm disposed to be moved by said cam into pressure contact with said first gear and to move the latter away from and declutch it from said cam thereby interrupting the driving connection between said cam and said first gear and stopping rotation of said second shaft, and temperature responsive means for turning said arm about its pivot and thereby moving said cam follower inward and outward substantially radially of said first gear responsive to increase and decrease in temperature respectively effective for varying the periods of time during which said second shaft is stopped in extent effective for compensating for the difference between the actual fluid content of the respective unit volumes metered at said standard temperature and the actual fluid content of the respective unit volumes metered at temperatures other than said standard temperature.

5. In a positive displacement meter for metering fluid by a predetermined unit volume and in which the actual fluid content per unit volume is based on a standard temperature of the fluid being metered, a continuously rotating unidirectional shaft driven by said meter, a second shaft parallel with said first shaft, a cam fixed on said first shaft and increasing in width substantially radially inwardly thereof, a first gear on said first shaft free therefrom and yieldingly urged toward said cam, clutch means normally establishing driving connection between said first gear and said cam, a second gear fixed on said second shaft meshing with said first gear effective for driving said second shaft in one direction opposite to the direction of rotation of said first shaft, a compensating index driven by said second shaft, an arm pivoted adjacent said second gear on an axis substantially parallel with said second shaft and overlapping the cam side of said first gear, said arm being substantially rigid perpendicular to its pivot axis and flexible parallel therewith, a cam follower carried by said arm disposed to be moved by said cam into pressure contact with said first gear and to move the latter away from and declutch it from said cam thereby interrupting the driving connection between said cam and said first gear and stopping rotation of said second shaft, and temperature responsive means for turning said arm about its pivot and thereby moving said cam follower inward and outward substantially radially of said first gear responsive to increase and decrease in temperature respectively effective for varying the periods of time during which said second shaft is stopped in extent effective for compensating for the difference between the actual fluid content of the respective unit volumes metered at said standard temperature and the actual fluid content of the respective unit volumes metered at temperatures other than said standard temperature, said cam follower having a friction surface disposed to contact said first gear and stop rotation thereof incident to declutching of said first gear from said cam.

References Cited in the file of this patent
UNITED STATES PATENTS

| | | |
|---|---|---|
| 529,365 | Connet et al. | Nov. 20, 1894 |
| 1,112,459 | Lea | Oct. 6, 1914 |
| 1,881,572 | Herz | Oct. 11, 1932 |
| 2,088,270 | McCandless | July 27, 1937 |
| 2,156,812 | Hazard | May 2, 1939 |
| 2,191,766 | Marsh | Feb. 27, 1940 |
| 2,208,687 | Renfrew | July 23, 1940 |
| 2,302,458 | Miner | Nov. 17, 1942 |
| 2,348,593 | Beitler | May 9, 1944 |